B. S. HARRISON.
GAS AND AIR TIGHT JOINT.
APPLICATION FILED AUG. 18, 1909.
1,032,753.
Patented July 16, 1912.
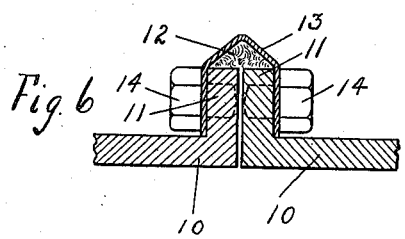
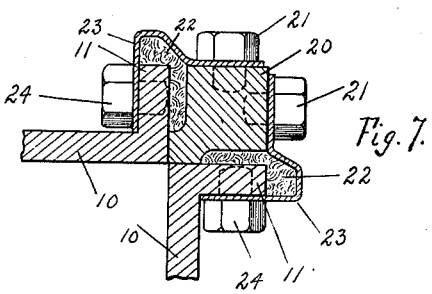
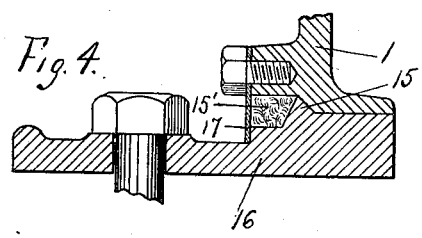
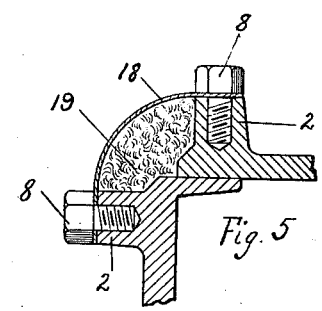
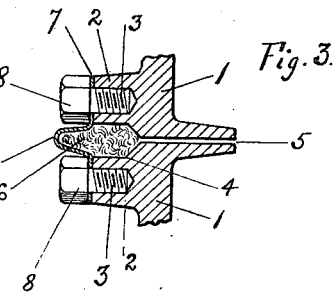
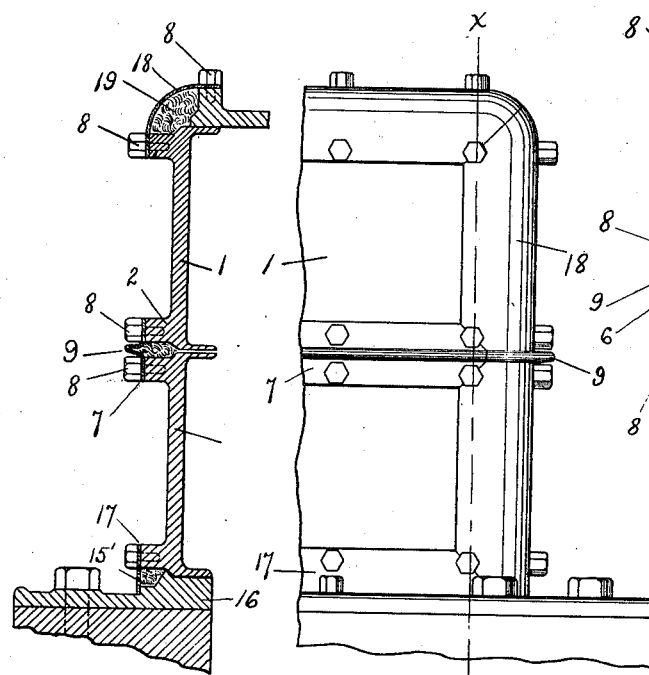

UNITED STATES PATENT OFFICE.

BURT S. HARRISON, OF NEW YORK, N. Y.

GAS AND AIR TIGHT JOINT.

1,032,753.  Specification of Letters Patent.  Patented July 16, 1912.

Original application filed January 15, 1909, Serial No. 472,401. Divided and this application filed August 18, 1909. Serial No. 513,401.

*To all whom it may concern:*

Be it known that I, BURT S. HARRISON, a citizen of the United States, residing at the borough of Brooklyn, in the city of New York, county of Kings, and State of New York, have invented a new and useful Improvement in Gas and Air Tight Joints, of which the following is a specification, this being a divisional application under my application for a patent for improvements in air tube heaters, filed January 15, 1909, Serial No. 472,401.

My invention relates to improvements in gas and air tight joints and the object of my invention is to provide a simple and effective joint which will prevent the escape of air and gases in furnaces and other structures when the parts expand and contract through heating and other causes. I accomplish this object by the device illustrated in the accompanying drawings in which—

Figure 1 is a view of my device in elevation, Fig. 2 is a sectional view of the same on the line $x$—$x$ in Fig. 1, Fig. 3 is a view of the joint between the plates, and Fig. 4 is a view of the joint between the plate and the case. Fig. 5 is a view of my preferred form of corner joint. Fig. 6 is an optional form of the joint between the plates. Fig. 7 is an optional form of the corner joint.

Similar reference characters refer to similar parts throughout the several views.

In the use of hot air heaters or furnaces for heating buildings, it is highly essential that the gases of combustion be kept from contaminating the heated air which is being delivered through the heater to the building. By reason, however, of the fact that no efficient means of sealing the joints against the escape of gases has heretofore been devised, heating furnaces have ordinarily been constructed of cast iron and the castings have been made as large as practicable so that joints might be avoided, as the expansions and contractions occurring under alterations of high and low degrees of heat open the seams and the escape of gases is but little retarded. These joints are usually cemented rigidly and on expansion the cement is cracked, and loosened and the joint opens up. Large castings are obviously objectionable as the variations of temperature frequently cause them to crack. By means of my improved sectional construction and method of sealing the joints, the seams are effectually sealed against the escape of gas, the expansion and contraction of the plates are provided for, and small plates of either wrought or cast iron may be used with no danger of the plates cracking or of the joints leaking. The plates being of a uniform size, are interchangeable and may be used in any desired combination or arrangement to obtain any desired capacity of heater.

While I have shown and will describe my improved device applied to a heater, it is not intended to confine it to this particular use and, as is obvious, it may be used to advantage wherever a tight joint is desired.

In the preferred form of my joint between plates, shown in Fig. 3, I provide, upon the margin of plates 1, 1 off set flanges 2 2 each provided with interiorly screw threaded seats 3 and recessed upon their outer faces 4. These plates are assembled in the completed structure with an air space 5 between them sufficient to permit such expansion as may occur. In the seat formed by the recesses in the outer faces 4 of the flanges 2, 2 is placed a gasket 6 of asbestos or other suitable material.

Upon the flanges 2 2 and over the gasket 6 is placed a plate 7 apertured to receive the bolts 8 8 which are passed through said apertures and screwed down into seats in the flanges 2 2. The cover plate 7 may be provided with a bent up section 9 to permit of expansion and contraction between the plates.

An optional form of joint between the plates is shown in Fig. 6 in which the flanges 11 11 of the plates 10, 10, are provided with interiorly screw threaded seats in their side faces. A gasket 12 of asbestos or other suitable material is placed upon the said flanges and held in position by the cover plate 13 which is apertured to receive bolts 14, 14 passed therethrough and screwed into the seats in the sides of the flanges. The joint between the plate and the base is formed by providing a flange 15 upon the base plate 16 to enter the recess in the plate 1. A gasket 15' of asbestos or other suitable material is placed within the seat thus formed and is held in place by the cover plate 17. The corner joint is formed by a cover plate 18 between the flanges 2 2 of the adjacent plates 1 1 and secured thereon by bolts 8 8 seated in the flanges as above described, a gasket 19 of suitable material being placed under the cover plate 18 between the flanges 2 2.

An optional form of corner joint is formed as shown in Fig. 7. In this form of the device I provide a corner block 20 apertured to receive the bolts 21, 21 and recessed upon its sides to form seats for the gasket 22 which is held in position by the cover plates 23 23. The cover plates 23 being held in position on the flanges 11 11 of the plates 10 10 by the bolts 24 24.

Having thus described my invention, what I claim is:

1. The combination of a plurality of counterpart plates, each provided on its outer face with a marginal flange set at a right angle to the body of the plate, a gasket of compressible material between the flanges of adjoining plates and a flexible cover over the gasket and so arranged that the contraction of the plates will compress the gasket between the plates by the bending of the flexible cover, substantially as shown and described.

2. The combination of a plurality of plates, each provided upon its outer face with a marginal flange and having a cut out seat for a gasket, a gasket in said seat, a flexible cover upon the gasket and secured to the plates and so arranged that the contraction of the plates will compress the gasket within its seat by the bending of the flexible cover, substantially as shown and described.

3. In a device of the character described a plurality of plates, a gasket of compressible material between adjacent plates, a flexible cover upon the gasket and secured to the adjoining plates and so arranged that the contraction of the plates will compress the gasket by the bending of the flexible cover, substantially as shown and described.

4. In a device of the character described, a plurality of plates, a gasket of compressible material between adjacent plates, a flexible cover upon the gasket and so arranged that the contraction of the plates will compress the gasket by the bending of the flexible cover, and retaining bolts inserted through the cover into the plates, substantially as shown and described.

In testimony whereof, I have signed my name to this specification in the presence of two subscribing witnesses, this seventh day of August 1909.

BURT S. HARRISON.

Witnesses:
JAS. M. HARRISON,
CHARLES H. NICHOLS.